US009811906B1

(12) United States Patent
Vizitiu et al.

(10) Patent No.: US 9,811,906 B1
(45) Date of Patent: Nov. 7, 2017

(54) METHOD AND DATA PROCESSING UNIT FOR SEGMENTING AN OBJECT IN A MEDICAL IMAGE

(71) Applicant: Siemens Healthcare GmbH, Erlangen (DE)

(72) Inventors: Anamaria Vizitiu, Sfantu Gheorghe (RO); Olivier Ecabert, Ebermannstadt (DE); Jan Kretschmer, Nuremberg (DE); Dominik Neumann, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 15/497,453

(22) Filed: Apr. 26, 2017

(30) Foreign Application Priority Data

Jul. 15, 2016 (EP) .................................. 16179770

(51) Int. Cl.
*G06K 9/00* (2006.01)
*G06T 7/00* (2017.01)
*G06T 7/11* (2017.01)
*A61B 1/00* (2006.01)

(52) U.S. Cl.
CPC .............. *G06T 7/0012* (2013.01); *G06T 7/11* (2017.01); *G06T 2207/20081* (2013.01); *G06T 2207/20084* (2013.01)

(58) Field of Classification Search
CPC .................................... G06K 9/00; G06T 7/00
USPC ........ 382/164, 171, 173, 177, 179; 600/141, 600/516
See application file for complete search history.

(56) References Cited

U.S. PATENT DOCUMENTS 8,837,771 B2 * 9/2014 Lay ........................ G06K 9/34
378/4

OTHER PUBLICATIONS

Wang L., et.al.: "A General Framework for Context-Specific Image Segmentation Using Reinforcement Learning", in: IEEE Transactions on Medical Imaging, vol. 32, No. 5, pp. 943-956; 2013.
Xie Yuanpu et al: "Deep Voting: A Robust Approach Toward Nucleus Localization in Microscopy Images"; Network and Parallel Computing; [Lecture Notes in Computer Science; Lect.Notes Computer], Springer International Publishing, CHAM; pp. 374-382; XP847337285; ISSN: 0302-9743; ISBN: 978-3-642-23677-8.

(Continued)

*Primary Examiner* — Abolfazl Tabatabai
(74) *Attorney, Agent, or Firm* — Harness, Dickey & Pierce, P.L.C.

(57) ABSTRACT

A method is for segmenting an object in a medical image with a plurality of iteration steps. In an embodiment of the method, each iteration step includes generating a plurality of patches, a portion of the input image and a patch location being assigned to each patch, the patch location being indicative of the location of the portion of the input image relative to the input image. For each patch of the plurality of patches, the method includes determining a vote location based on the portion of the input image assigned to that patch and determining a target location based on the vote location and the patch location assigned to that patch. Finally, in an embodiment the method includes generating a vote map, each patch of the plurality of patches contributing to a pixel value at the target location of the patch in the vote map.

37 Claims, 7 Drawing Sheets

(56) References Cited

OTHER PUBLICATIONS

Milletari Fausto et al: "Robust Segmentation of Various Anatomies in 3D Ultrasound Using Hough Forests and Learned Data Representations"; Network and Parallel Computing; [Lecture Notes in Computer Science; Lect.Notes Computer]; Springer International Publishing, CHAM, pp. 111-118; XP047326886;ISSN: 8302-9743; ISBN: 978-3-642-23677-8.
Milletari F., et.al.: "Hough-CNN: Deep Learning for Segmentation of Deep Brain Regions in MRI and Ultrasound", in: Preprint submitted to Pattern Recognition, pp. 1-34.
Heimann T., Meinzer H.: "Statistical shape models for 3D medical image segmentation: a review", in: Medial Image Analysis, vol. 13, No. 4, pp. 543-563, 2009; 2009.
Extended European Search Report dated Jan. 24, 2017.
European Search Report for Application No. 16179770.9 dated Jan. 24, 2017 23, 2017.
Wang A General Framework for Context-Specific Image Segmentation Using Reinforcement Learning Dec. 2012.
Milletari Robust Segementation of Various Anatomies in 3D Ultrasound Using Hough Forests and Learned Data Representatives 2015.
XIE Deep Voting: A Robust Approach Toward Nucleus Localization in Microscopy Images 2015.
Milletari Hough—CNN Deep Learning for Segmentation of Deep Brain Regions in MRI and Ultrasound Feb. 2016.
Heimann Statistical shape models for 3D medical image segmentation May 2009.

* cited by examiner

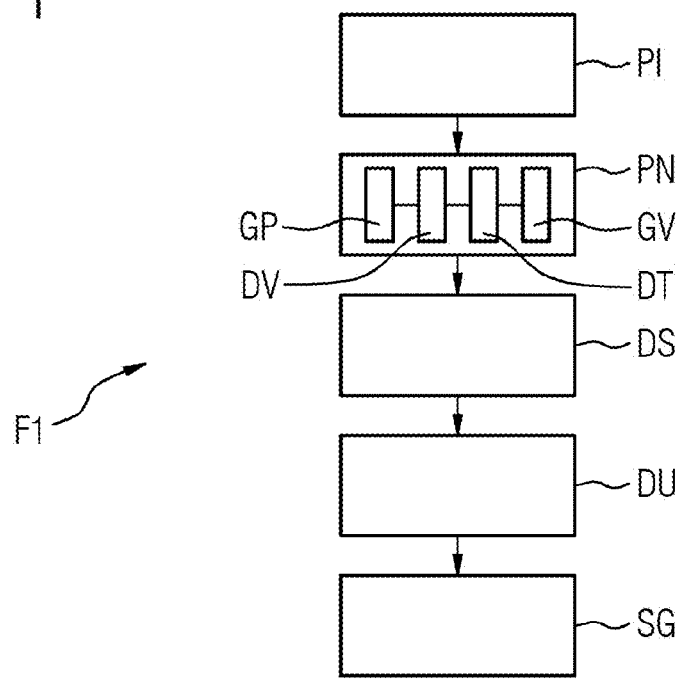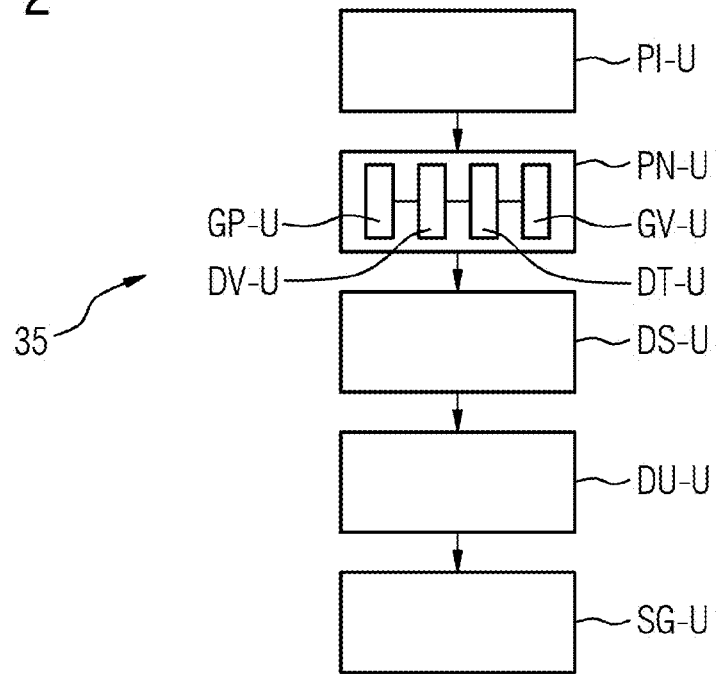

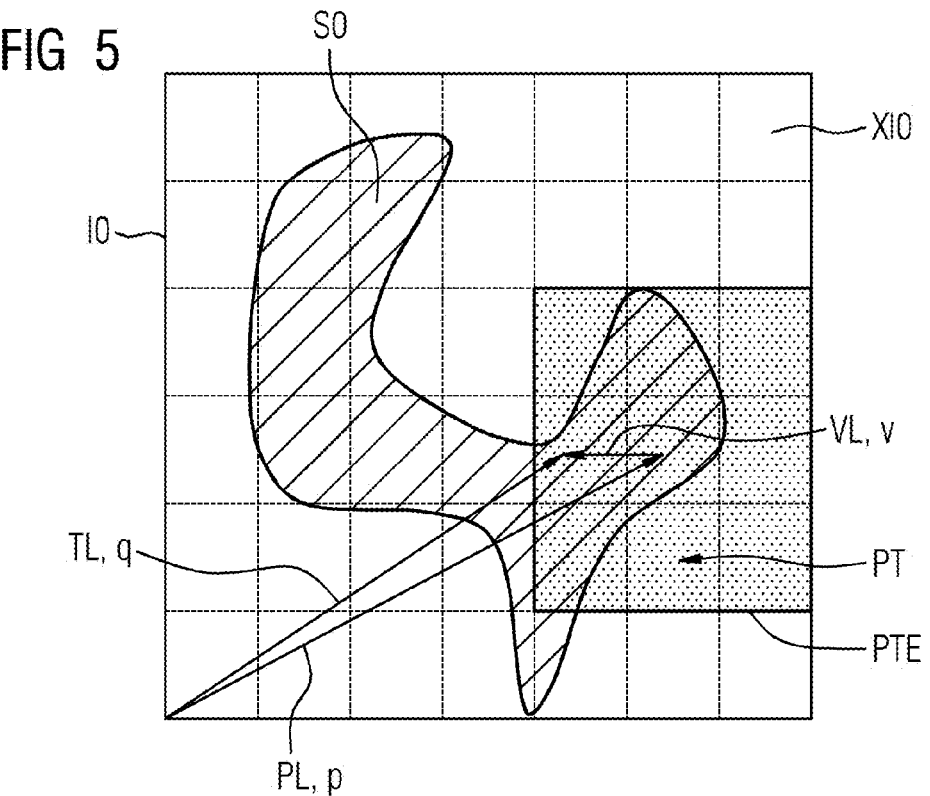
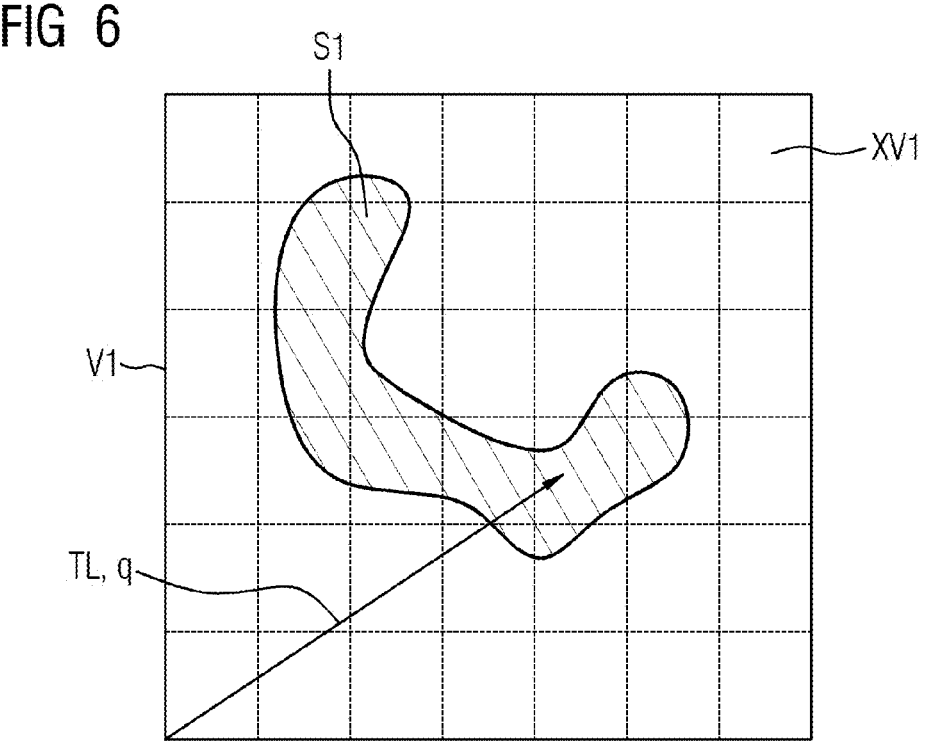

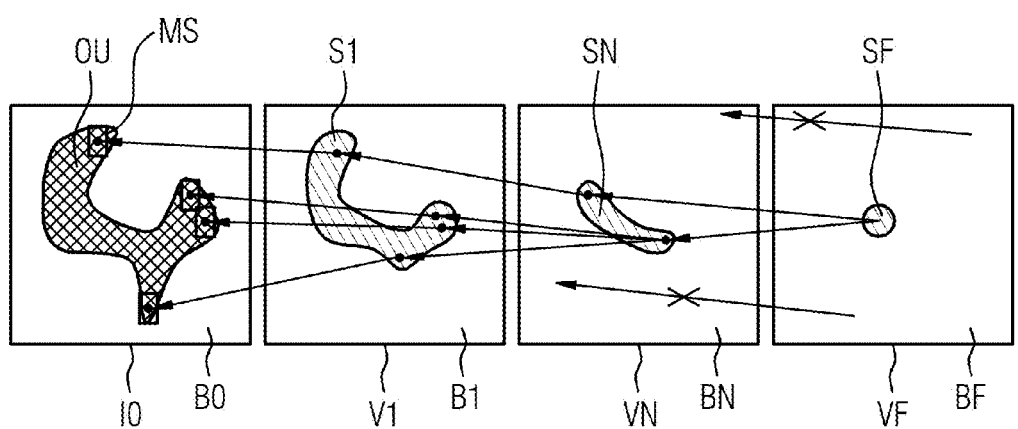

METHOD AND DATA PROCESSING UNIT FOR SEGMENTING AN OBJECT IN A MEDICAL IMAGE

PRIORITY STATEMENT

The present application hereby claims priority under 35 U.S.C. §119 to European patent application number EP 16179770.9 filed Jul. 15, 2016, the entire contents of which are hereby incorporated herein by reference.

FIELD

At least one embodiment of the invention generally relates to a method for segmenting an object in a medical image. In another embodiment, the invention generally relates to a data processing unit for segmenting an object in a medical image. In further embodiments, the invention generally relates to a medical imaging device, a computer program product and/or a computer-readable medium.

BACKGROUND

Medical image segmentation, i.e. the extraction of geometric models of anatomical structures in the human body from medical images (Magnetic Resonance, Ultrasound, Computed Tomography, Fluoroscopy is a vital part in many clinical workflows such as diagnostics, procedure planning or imagebased interventional support/guidance.

Segmentation can be tedious and time-consuming, especially if done manually, thus there is a need for advanced tools to automate or interactively support this task to make it more efficient, robust, and reproducible.

However, in many cases the development of such tools is non-trivial as it requires in-depth knowledge of the structure of interest (organ, anatomy, . . . ) to define a set of features and rules that can perform the segmentation task effectively for various structure shapes (pathologies, . . . ) and for varying image quality.

In fact, most segmentation algorithms are tailored to one specific combination of anatomical structure of interest and imaging modality (or acquisition protocol). Therefore, the adaption of an algorithm to new environments, for example regarding the imaging setup and/or the clinical task, or even different image quality can become a challenging and expensive undertaking.

Hence, generically applicable algorithms and/or image features that require less domain-specific knowledge would be desirable. Moreover, an important aspect in developing such tools is the intention of the end-user.

For many segmentation tasks there exists more than one valid segmentation and the correct (intended by user) segmentation may vary based on the use-case or a specific user's preference. For instance, for a segmentation of the left endocardial border of the heart (FIG. 11), one user may expect a precise delineation of the blood-pool from all other structures, while another user may prefer a "smoother" representation that should include the papillary muscles and trabeculae.

Many segmentation algorithms are designed to follow one single intention (e.g. one of the scenarios described above) and once shipped to the user, they cannot be adapted to changing requirements or user preferences. In many clinical scenarios the segmentation task is still performed manually. An expert operator (clinician or technician) has to precisely annotate the structure of interest 2D or 3D medical images using standard image visualization and annotation software. Therefore, the results may not be reproducible and the quality may vary significantly based on the experience of the operator. Moreover, manual segmentation is usually a tedious and time-consuming process.

To overcome some of the problems with manual segmentation, a multitude of automatic or semi-automatic segmentation algorithms have been proposed [1]. Many of them try to solve the segmentation problem by analyzing image intensities, by relying on shape constraints, or by a combination of both. More often than not they are heavily fine-tuned and targeted towards the segmentation of a single, pre-defined structure in the body, and they may work only for a specific imaging modality or acquisition protocol.

Therefore, such algorithms may fail in cases where, for instance, the shape of the structure to be segmented is highly pathological (unseen during development phase) or if the image appearance (distribution of intensities, etc.) differs from typical images. Most automatic algorithms are designed to perform segmentation following strict requirements, usually defined by a clinician or a group of clinicians, i.e. according to a specific user intention. However, as mentioned above, the intentions of different users or for different use-cases can be different and even change over time. Even after the development of the segmentation algorithm has been finalized and the software shipped to the end-user.

There exist few approaches that try to modify some components of an algorithm's behavior based on user inputs [2] that are applicable for basic structures with various simplifying assumptions. Typically, these approaches do not provide general mechanisms to adapt an algorithm to new users or to automatically learn from user interaction (no continuous improvement). In many cases, to modify the automatic segmentation result, tedious manual editing of the same kind is needed every time the outcome does not satisfy the user's requirements. Algorithms of this kind do not adjust themselves.

SUMMARY

The inventors have recognized that an underlying technical problem of at least one embodiment of the invention is to facilitate an improved segmentation of an object in a medical image.

An embodiment of the present application is directed to a method; an embodiment of the present application is directed to a data processing unit; an embodiment of the present application is directed to a medical imaging device; an embodiment of the present application is directed to a computer program product; and an embodiment of the present application is directed to a computer-readable medium. The claims are related to embodiments of the invention.

At least one embodiment of the present application relates to a method for segmenting an object in a medical image, the method comprising:
a) providing the medical image,
b) performing a plurality of iteration steps,
  wherein the input of the first iteration step of the plurality of iteration steps comprises the medical image as an input image,
  wherein the input of each further iteration step of the plurality of iteration steps comprises a vote map generated in the preceding iteration step as the input image,
c) determining a structure in the vote map of the final iteration step of the plurality of iteration steps,
d) determining a subset of patches of the plurality of patches of the first iteration step that contributed to the structure in the vote map of the final iteration step, and e) segmenting the object based on the subset of patches to obtain a segmentation outcome.

At least one embodiment of the invention relates to a data processing unit for segmenting an object in a medical image, the data processing unit comprising:

a) a providing unit configured for providing the medical image, b) an iteration unit configured for performing a plurality of iteration steps, wherein the input of the first iteration step of the plurality of iteration steps comprises the medical image as an input image, wherein the input of each further iteration step of the plurality of iteration steps comprises a vote map generated in the preceding iteration step as the input image, wherein each iteration step of the plurality of iteration steps comprises:

i) generating a plurality of patches, wherein a portion of the input image and a patch location are assigned to each patch of the plurality of patches, the patch location being indicative of the location of the portion of the input image relative to the input image, ii) for each patch of the plurality of patches
determining a vote location based on the portion of the input image assigned to that patch and
determining a target location based on the vote location and the patch location assigned to that patch, iii) generating a vote map, wherein each patch of the plurality of patches contributes to a pixel value at the target location of that patch in the vote map, c) a structure-determining unit configured for determining a structure in the vote map of the final iteration step of the plurality of iteration steps, d) a subset-determining unit configured for determining a subset of patches of the plurality of patches of the first iteration step that contributed to the structure in the vote map of the final iteration step, e) a segmenting unit configured for segmenting the object based on the subset of patches to obtain a segmentation outcome.

One embodiment of the invention relates to a data processing unit configured for performing the method according to an embodiment of the invention.

At least one embodiment of the invention relates to a medical imaging device, comprising the data processing unit according to an embodiment of the invention.

At least one embodiment of the invention relates to a computer program product comprising a computer program, the computer program being loadable into a memory unit of a data processing system, including program code sections to make the data processing system execute the method according to an embodiment of the invention when the computer program is executed in said data processing system.

At least one embodiment of the invention relates to a computer-readable medium, on which program code sections of a computer program are saved, said program code sections being loadable into and/or executable in a data processing system to make the data processing system execute the method according to an embodiment of the invention when the program code sections are executed in said data processing system.

According to one embodiment of the invention, in a first stage, the medical image is passed to the algorithm and transformed into a vote map, which can be understood as an intermediate image, which contains a more compact and simplified representation of the original medical image.

BRIEF DESCRIPTION OF THE DRAWINGS

The invention will be illustrated below with reference to the accompanying figures using example embodiments. The illustration in the figures is schematic and highly simplified and not necessarily to scale.

FIG. 1 shows a diagram illustrating a method according to one embodiment of the invention.

FIG. 2 shows a data processing unit according to one embodiment of the invention.

FIG. 5 shows the medical image and the patch according to one embodiment of the invention.

FIG. 6 shows the vote map of the first iteration step with the medical image as an input image.

FIG. 7 shows possible backward traces through the different iteration steps for some example patches.

DETAILED DESCRIPTION OF THE EXAMPLE EMBODIMENTS

Figure 3:
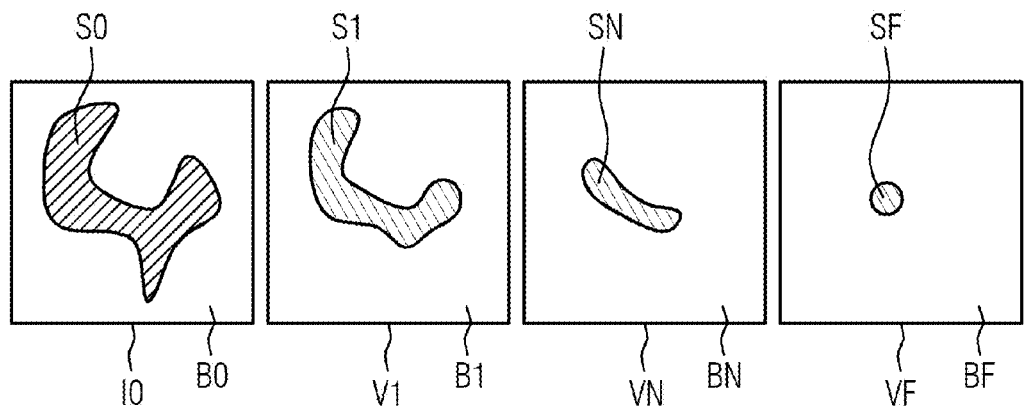
FIG. 3 and FIG. 4 show an illustration of the simplification process of a rather complex initial shape.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the present application relates to a method for segmenting an object in a medical image, the method comprising:
a) providing the medical image,
b) performing a plurality of iteration steps,
 wherein the input of the first iteration step of the plurality of iteration steps comprises the medical image as an input image,
 wherein the input of each further iteration step of the plurality of iteration steps comprises a vote map generated in the preceding iteration step as the input image,
c) determining a structure in the vote map of the final iteration step of the plurality of iteration steps,
d) determining a subset of patches of the plurality of patches of the first iteration step that contributed to the structure in the vote map of the final iteration step, and
e) segmenting the object based on the subset of patches to obtain a segmentation outcome.

In an embodiment, each iteration step of the plurality of iteration steps comprises:
i) generating a plurality of patches, wherein a portion of the input image and a patch location are assigned to each patch of the plurality of patches, the patch location being indicative of the location of the portion of the input image relative to the input image,
ii) for each patch of the plurality of patches
 determining a vote location based on the portion of the input image assigned to that patch and
 determining a target location based on the vote location and the patch location assigned to that patch,
iii) generating a vote map, wherein each patch of the plurality of patches contributes to a pixel value at the target location of that patch in the vote map.

The final iteration step of the plurality of iteration steps can be, for example, the iteration step of the plurality of iterations, at which a termination criterion is fulfilled. The termination criterion can be related, for example, to an iteration step count and/or to a measure of complexity of the shape that represents the object in the vote map.

One embodiment of the invention relates in one aspect to a method,
 wherein the patch location assigned to a given patch is the location of the center pixel of the portion of the input image assigned to the given patch relative to the input image and/or
 wherein the vote location for a given patch is a vector of the same dimension as the portion of the input image assigned to the given patch.

One embodiment of the invention relates in one aspect to a method,
 wherein generating the vote map comprises:
 initializing the vote map to a predefined map,
 for each patch of the plurality of patches adjusting a pixel value at the target location of that patch in the vote map.

One embodiment of the invention relates in one aspect to a method,
 wherein the pixel value at the target location in the vote map is adjusted by incrementing the pixel value at the target location in the vote map by a predefined increment.

One embodiment of the invention relates in one aspect to a method,
 wherein the structure in the vote map of the final iteration step is determined based on the pixel values of the pixels of the vote map of the final iteration step and/or
 wherein the structure in the vote map of the final iteration step is determined by comparing the pixel values of the pixels of the vote map of the final iteration step with a threshold.

One embodiment of the invention relates in one aspect to a method,
 wherein the structure in the vote map of the final iteration step is determined based on a segmentation algorithm, wherein the input of the segmentation algorithm comprises the vote map of the final iteration step.

One embodiment of the invention relates in one aspect to a method,
 wherein each iteration step of the plurality of iteration steps further comprises:
 generating a back-reference information, wherein for each pixel of the vote map, to which at least one patch of the plurality of patches contributed, the back-reference information designates the at least one patch of the plurality of patches that contributed to that pixel of the vote map.

One embodiment of the invention relates in one aspect to a method,
 wherein the subset of patches is determined based on the back-reference information of each iteration step of the plurality of iteration steps.

One embodiment of the invention relates in one aspect to a method,
 wherein segmenting of the object based on the subset of patches comprises:
 aggregating the patches of the subset of patches, wherein each patch of the subset of patches is allocated based on the patch location and/or the vote location of that patch, thereby obtaining the segmentation outcome.

One embodiment of the invention relates in one aspect to a method,
 wherein segmenting of the object based on the subset of patches comprises:
 providing a plurality of segmentation masks,
 determining a subset of segmentation masks of the plurality of segmentation masks, wherein for each patch of the subset of patches a corresponding segmentation mask of the subset of segmentation masks is determined, the corresponding segmentation mask being similar to that patch, aggregating the segmentation masks of the subset of segmentation masks, wherein each segmentation mask of the subset of segmentation masks is allocated based on the patch location and/or the vote location of the patch corresponding to that segmentation mask, thereby obtaining the segmentation outcome.

One embodiment of the invention relates in one aspect to a method,
wherein for each patch of the subset of patches the corresponding segmentation mask of the subset of segmentation masks is determined based on a patch encoding of that patch.

One embodiment of the invention relates in one aspect to a method,
wherein for each patch of the plurality of patches the vote location is determined based on a function, the input of the function comprising the portion of the input image assigned to that patch.

One embodiment of the invention relates in one aspect to a method, the method further comprising:
providing a first set of training pairs, each training pair of the first set of training pairs comprising a training image and a corresponding training vote location,
determining the function based on the first set of training pairs.

One embodiment of the invention relates in one aspect to a method, the method further comprising:
editing the segmentation outcome,
determining a set of further training pairs based on the edited segmentation outcome, each further training pair of the set of further training pairs comprising a training image and a corresponding training vote location,
determining a second set of training pairs based on the set of further training pairs and/or at least a subset of the first set of training pairs, and
determining the function based on the second set of training pairs.

One embodiment of the invention relates in one aspect to a method,
wherein determining the second set of training pairs comprises:
representing the first set of training pairs by a sequence, wherein the training pairs of the first set of training pairs are subsequently ordered,
subsequently appending the further training pairs of the set of further training pairs to the sequence.

One embodiment of the invention relates in one aspect to a method,
wherein determining the second set of training pairs further comprises:
removing a subsequence of training pairs of the first set of training pairs from the sequence.

One embodiment of the invention relates in one aspect to a method,
wherein the sequence comprises a first part and a second part, one of the first part and the second part comprising the beginning of the sequence and the other one of the first part and the second part comprising the end of the sequence,
wherein the further training pairs of the set of further training pairs are appended subsequently at the first part of the sequence and/or
wherein the subsequence of training pairs of the first set of training pairs is removed from the second part of the sequence.

One embodiment of the invention relates in one aspect to a method,
wherein the number of the training pairs of the subsequence, which is removed from the sequence, corresponds to the number of further training pairs of the set of further training pairs appended subsequently to the sequence.

One embodiment of the invention relates in one aspect to a method,
wherein determining the function based on the first set of training pairs comprises training a machine learning system based on the first set of training pairs, thereby obtaining the function, and/or
wherein determining the function based on the second set of training pairs comprises training a machine learning system based on the second set of training pairs, thereby obtaining the function.

One embodiment of the invention relates in one aspect to a method,
wherein the machine learning system and/or the function is based on an artificial neural network.

One embodiment of the invention relates in one aspect to a method,
wherein the artificial neural network comprises a convolutional neural network.

At least one embodiment of the invention relates in one aspect to a data processing unit for segmenting an object in a medical image, the data processing unit comprising:
a) a providing unit configured for providing the medical image,
b) an iteration unit configured for performing a plurality of iteration steps,
wherein the input of the first iteration step of the plurality of iteration steps comprises the medical image as an input image,
wherein the input of each further iteration step of the plurality of iteration steps comprises a vote map generated in the preceding iteration step as the input image,
wherein each iteration step of the plurality of iteration steps comprises:
i) generating a plurality of patches, wherein a portion of the input image and a patch location are assigned to each patch of the plurality of patches, the patch location being indicative of the location of the portion of the input image relative to the input image,
ii) for each patch of the plurality of patches
determining a vote location based on the portion of the input image assigned to that patch and
determining a target location based on the vote location and the patch location assigned to that patch,
iii) generating a vote map, wherein each patch of the plurality of patches contributes to a pixel value at the target location of that patch in the vote map,
c) a structure-determining unit configured for determining a structure in the vote map of the final iteration step of the plurality of iteration steps,
d) a subset-determining unit configured for determining a subset of patches of the plurality of patches of the first iteration step that contributed to the structure in the vote map of the final iteration step,
e) a segmenting unit configured for segmenting the object based on the subset of patches to obtain a segmentation outcome.

One embodiment of the invention relates in one aspect to a data processing unit configured for performing the method according to an embodiment of the invention.

At least one embodiment of the invention relates in one aspect to a medical imaging device, comprising the data processing unit according to an embodiment of the invention.

At least one embodiment of the invention relates in one aspect to a computer program product comprising a computer program, the computer program being loadable into a memory unit of a data processing system, including program code sections to make the data processing system execute the method according to an embodiment of the invention when the computer program is executed in said data processing system.

At least one embodiment of the invention relates in one aspect to a computer-readable medium, on which program code sections of a computer program are saved, said program code sections being loadable into and/or executable in a data processing system to make the data processing system execute the method according to an embodiment of the invention when the program code sections are executed in said data processing system.

According to one embodiment of the invention, in a first stage, the medical image is passed to the algorithm and transformed into a vote map, which can be understood as an intermediate image, which contains a more compact and simplified representation of the original medical image.

Then the vote map, or, in other words, the intermediate image, is passed as input to a second stage of the algorithm which again transforms the simplified image into an even simpler representation.

This process can be iterated many times and stop once a sufficient degree of simplicity is reached. Points and/or blobs are one of the simplest structures. Therefore, the final stage of the hierarchy, i.e. the final iteration step, preferably should yield an image with a blob-like structure. The simplified image Is in a given stage s is generated from the image Is-1 of the previous stage. Thanks to the hierarchical design, the proposed method can handle the segmentation of highly complex anatomical structures through iterative object simplification.

For each iteration step of the plurality of iteration steps, the input image is scanned in a patch-wise fashion. For n-dimensional input images (typically n=2 or n=3), patches of size mn pixels (e.g., m=15) can be used. Anisotropic patch sizes and/or patch sizes that vary based on the patch location and/or an iteration step count are also possible.

Let P denote such an image patch in the input image Is-1 and p=center(P) the patch location of the patch P, for example the location of the center pixel of P in the original image coordinate system.

Let v denote an n-dimensional vector of real numbers, representing the vote location. Let f denote a function that maps any P to a vector v, i.e., v=f(P), such that the vector q=p+v representing the target location is the location in Is of a simplified version of the part of the object contained in P. In the context of this application, this function is also called regression function or regressor. The function could be, for example, a convolutional neural network (CNN), a neural network-based regressor or any other type of regression function. A convolutional neural network (CNN) can be configured for selecting a member function of a class of functions based on adaptive weigths tuned by a learning algorithm. The method according to one embodiment of the invention could use either a convolutional neural network (CNN) based regression function or other types of regression functions.

Initially all pixel values of the vote map Is are zero. P votes for q by incrementing the pixel value in the simplified image Is(q):=Is(q)+1. Thus Is could be seen as a vote map, where pixels that are within the shape of the simplified object has high number of votes, while "background" pixels have none or only very low number of votes. According to one embodiment of the invention, the method therefore provides an automatic Hough-voting based segmentation framework.

The output of the function f comprises the vote location. The choice of f can be largely varying and can be data-driven. This means f can be learned from or trained on previously seen data using regression methods, machine learning methods or artificial intelligence methods. The regressor f can, but is not required to, try to vote for the center of gravity of the part of the object contained in P. Determining the voting location can be application dependent. Depending on the shape of an object, it might be advantageous to vote for other points of higher saliency.

According to one embodiment of the invention, the target location can be represented by a vector, which is the sum of a vector representing the patch location and a vector representing the vote location. The vote location is not restricted to a location contained in the patch. According to one embodiment of the invention, the vote location can be outside the patch and/or comprise a group of pixels.

During the various stages of the hierarchical algorithm, back-reference lists are generated that, if evaluated in reverse order, enable the tracing from a structure, for example a blob-like structure, determined in the vote map of the final iteration step to all patches in the original image that contributed to that structure. Information from all those patches is then aggregated to form the segmentation. A possible aggregation approach is described in [3]. For each patch of the plurality of patches a segmentation mask can be stored. The segmentation masks of corresponding patches (according to a patch encoding) can be retrieved from a database and allocated at the patch locations of the corresponding patches. According to one embodiment of the invention, each segmentation mask of the plurality of segmentation mask is a binary segmentation mask. Each pixel of a binary segmentation mask has a value that is equal to one of two predefined values, for example 0 or 1.

According to one embodiment of the invention, the function is trained based on a first set of training pairs $\{(P, v)\}$, i.e. from a database DB=$\{(P, v)\}$ of many pairs of patches P and corresponding vectors v representing the corresponding training vote location. If the user is not satisfied with the segmentation result, the user can edit the segmentation outcome, for instance via an interactive tool that allows the user to move the boundaries of the segmented object to a different location. This information can then be used to adapt the segmentation algorithm. Whenever the user performs such a manual edit, an algorithm identifies the affected patches and generates one or more further training pairs of the set of further training pairs DBnew=$\{(Pnew, vnew)\}$ that represent the change done by the user. A database for storing data related to the patch is updated accordingly. Basically, the following information is generated: "patch Pnew pointed to the wrong location. It should actually point to vnew".

The further training pairs of the set of further training pairs can then be used to update the regressor, i.e. to change the behavior of f. The regressor f could be re-trained from scratch using only the set of further training pairs, fnew=train_on(DBnew), or the already available ("offline") first set of training pairs $\{(P,v)\}$ plus the ("online") set of further training pairs $\{(Pnew, vnew)\}$: fnew=train_on(DB-new∪DB), or, if an iterative learning process is supported by the training method for f that allows, for example, each training pair to be presented independently (e.g. when using neural networks), the set of further training pairs could be input to a new iteration of the learning procedure, fnew=update(f; DBnew).

According to one embodiment of the invention, one approach to update the regressor f based on the set of further training pairs {(Pnew, vnew)} is to rely on an array containing the k most recent training pairs of the first set of training pairs {(P,v)}. Typically values for k could be 100, 1000, 10000 or the like. This approach could be called a "smooth adaptive neural memory".

Let (P1, v1), (P2, v2), (P3, v3), (P4, v4), (P5, v5), . . . (Pk-1, vk-1), (Pk, vk) denote the training pairs of the first set of training pairs. Whenever a further training pair (Pnew, vnew) of the set of further training pairs is added, the "oldest" training pair of the first set of training pairs is removed from the sequence, thereby obtaining the second set of training pairs: (P2, v2), (P3, v3), (P4, v4), (P5, v5), . . . (Pk-1, vk-1), (Pk, vk), (Pnew, vnew). According to one embodiment of the invention, the number of the training pairs of the subsequence, which is removed from the sequence, is equal to the number of further training pairs of the set of further training pairs appended subsequently to the sequence.

At any time, e.g. every time a further training pair is appended, or as soon as a pre-defined number of further training pairs was appended, the regressor can be re-trained online (from scratch or otherwise) based on the second set of training pairs. Compared to training from scratch using only the set of further training pairs generated based on a user input, the whole segmentation framework is less prone to user errors, as it does not rely only on the set of further training pairs.

In addition to the set of further training pairs, a certain number of training pairs of the first set of training pairs can be used for re-training the regressor f. Therefore, even if the further training pairs are of poor quality, the segmentation is much less likely to fail completely for the next medical image to be segmented because the training pairs of the first set of training pairs may be able to cancel out (to some degree) the errors introduced by the further training pairs. The details depend on the type of regressor and learning method used. If the "user intention" changes and the user consistently performs new edits according to the new intention, then after several edits (depending on the size k of the "smooth adaptive neural memory"), all training pairs of the first set of training pairs will be forgotten eventually; they get removed from the sequence and/or from the database. Therefore it is possible to adapt the segmentation behavior significantly, if needed. The parameter k controls the "smoothness" of the transition from the previous to the new intention, i.e. how fast the regressor f adapts to a "new intention". Depending on the experience of the user and other factors this parameter can be adjusted.

Therefore, the segmentation algorithm can adapt to a new user and/or to a new requirements. The adaptation is transparent to the user and can be integrated seamlessly in a segmentation workflow, as it can be directly based on user feedback, which is manual editing/refinement of the algorithm-generated segmentations.

If self-adaption is enabled, a history of previous f can be stored. If f is a neural network, storing f means storing a number of weighting parameters, which is straightforward to implement. Therefore, whenever a user wants to revert to a previous behavior of the algorithm, the user can "roll back" simply by "loading" the old regressor f. If f can be stored, it can also be shared among different user, different installations and different institutions, etc.

Experts could thus share their segmentation expertise by adapting f using their local installation of the segmentation algorithm and user interface, simply by processing and editing many example images. The algorithm will adapt automatically and the resulting f can be distributed to colleagues and other users. The so called "smooth adaptive neural memory" can be used to smoothen the transition phase.

The data processing unit can be realized as a data processing system or as a part of a data processing system. The data processing system can, for example, comprise cloud-computing system, a computer network, a computer, a tablet computer, a smartphone or the like. The data processing system can comprise hardware and/or software. The hardware can be, for example, a processor system, a memory system and combinations thereof. The hardware can be configurable by the software and/or be operable by the software.

The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

The medical imaging device can be, for example, be selected from the group consisting of a computed tomography device, a magnetic resonance imaging device, a molecular imaging device, a SPECT-device, a PET-device and combinations thereof. The medical imaging device can be, for example, a combination of an imaging modality and a therapy modality, in particular a radiation therapy modality.

Reference is made to the fact that the described methods and the described data processing unit as well as the described imaging device are merely preferred example embodiments of the invention and that the invention can be varied by a person skilled in the art, without departing from the scope of the invention provided it is specified by the claims.

FIG. 1 shows a diagram illustrating a method according to one embodiment of the invention, the method comprising:
a) providing PI the medical image I0,
b) performing PN a plurality of iteration steps,
    wherein the input of the first iteration step of the plurality of iteration steps comprises the medical image I0 as an input image,
    wherein the input of each further iteration step of the plurality of iteration steps comprises a vote map generated in the preceding iteration step as the input image,
    wherein each iteration step of the plurality of iteration steps comprises:
i) generating GP a plurality of patches, wherein a portion of the input image and a patch location PL are assigned to each patch of the plurality of patches, the patch location PL being indicative of the location of the portion of the input image relative to the input image,
ii) for each patch of the plurality of patches
    determining DV a vote location VL based on the portion of the input image assigned to that patch and
    determining DT a target location TL based on the vote location VL and the patch location PL assigned to that patch,
iii) generating GV a vote map, wherein each patch of the plurality of patches contributes to a pixel value at the target location TL of that patch in the vote map, c) determining DS a structure SF in the vote map VF of the final iteration step of the plurality of iteration steps,
d) determining DU a subset of patches of the plurality of patches of the first iteration step that contributed to the structure SF in the vote map VF of the final iteration step,
e) segmenting SG the object based on the subset of patches to obtain a segmentation outcome OU.

Providing the medical image I0 can comprise, for example, receiving the medical image I0 from the image reconstruction unit 36 and/or loading the medical image I0 from a medical image database.

FIG. 2 shows a data processing unit according to one embodiment of the invention, comprising:
a) a providing unit PI-U configured for providing PI the medical image I0,
b) an iteration unit PN-U configured for performing PN a plurality of iteration steps,
c) a structure-determining unit DS-U configured for determining DS a structure SF in the vote map VF of the final iteration step of the plurality of iteration steps,
d) a subset-determining unit DU-U configured for determining DU a subset of patches of the plurality of patches of the first iteration step that contributed to the structure SF in the vote map VF of the final iteration step,
e) a segmenting unit SG-U configured for segmenting SG the object based on the subset of patches to obtain a segmentation outcome OU.

The iteration unit PN-U comprises:
i) a patch-generating unit GP-U configured for generating GP a plurality of patches, wherein a portion of the input image and a patch location PL are assigned to each patch of the plurality of patches, the patch location PL being indicative of the location of the portion of the input image relative to the input image,
ii) a vote-location-determining unit DV-U configured for determining DV a vote location VL for each patch of the plurality of patches based on the portion of the input image assigned to that patch and a target-location-determining unit DT-U configured for determining DT a target location TL for each patch of the plurality of patches based on the vote location VL and the patch location PL assigned to that patch,
iii) a vote-map-generating unit GV-U configured for generating GV a vote map, wherein each patch of the plurality of patches contributes to a pixel value at the target location TL of that patch in the vote map.

Figure 4:
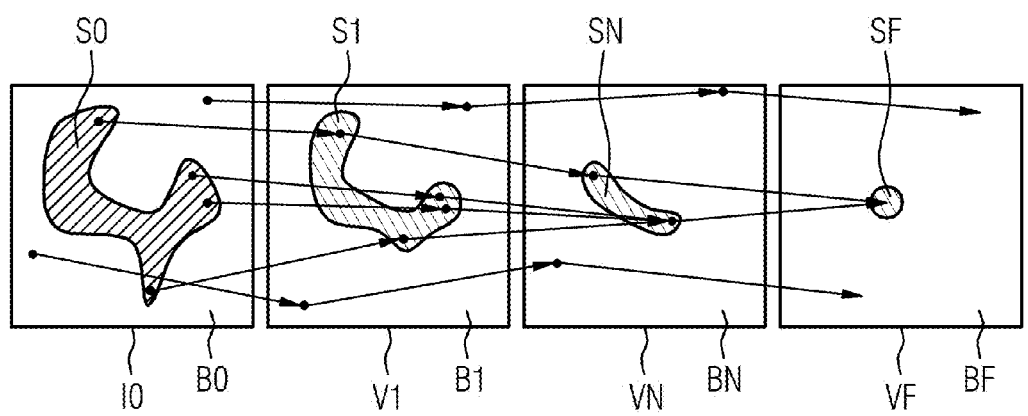

FIG. 3 and FIG. 4 show an illustration of the simplification process of a rather complex initial shape S0 of the object in the medical image I0 through subsequent (hierarchical) iteration steps according to one embodiment of the invention. B0 is the background of the medical image B0.

The vote map V1 is generated in the first iteration step of the plurality of iterations. The input image of the first iteration step is the medical image I0.

The vote map V1 comprises the shape S1 that represents the object in the vote map V1. The shape S1 is formed by pixels of the vote map V1, the pixel values of which are distinct from the background B1 due to the contributions of the patches of the medical image I0.

The vote map VN is generated in the nth iteration step of the plurality of iterations. The input image of the nth iteration step is the vote map of the iteration step preceding the nth iteration step.

The vote map VN comprises the shape SN that represents the object in the vote map VN. The shape SN is formed by pixels of the vote map VN, the pixel values of which are distinct from the background BN of the vote map VN due to the contributions of the patches that were generated in the nth iteration step.

The vote map VF is generated in the final iteration step of the plurality of iterations. The input image of the final iteration step is the vote map of the iteration step preceding the final iteration step.

The vote map VF comprises the shape SF that represents the object in the vote map VF. The shape SF is formed by pixels of the vote map VF, the pixel values of which are distinct from the background BF of the vote map VF due to the contributions of the patches generated in the final iteration step.

Eventually, the rather complex initial shape of the object turns into a blob-like structure SF in the vote map VF of the final iteration step. The blob-like structure SF can be easily determined, for example by comparing the pixel values of the pixels of the vote map VF of the final iteration step with a threshold. Thus, the blob-like structure can be determined, for example, as consisting of all the pixels with pixel values exceeding the threshold.

According to one embodiment of the invention, the boundaries of the shape S1, SN, SF in the vote map V1, VN, VF might be blurred. In particular, the number of patches contributing to the value of a given pixel, can decrease with increasing distance of the given pixel to the inner region of the shape S1, SN, SF.

In FIG. 4, the arrows depict possible forward traces through the different iteration steps for some example patches.

For each iteration step of the plurality of iteration steps, the input image is scanned patch-wise and for each patch PT a vector q is predicted that points to the target location TL.

If a patch does not contain pixels associated with a part of the object, the vector v may point to a random location or be the zero vector and/or the target location may be a random location or a predefined location, said predefined location being a priori distinct from the object and/or from the structure in the vote map of the final iteration step.

FIG. 5 shows the medical image I0 and the patch PT according to one embodiment of the invention.

The medical image I0 comprises a plurality of pixels XI0. The portion of the medical image I0 that is assigned to the patch PT is surrounded by the continuous line PTE and marked with the dotted area.

The patch location PL is represented by the vector p. The vote location VL is represented by the vector v. The target location TL is represented by the vector q. The vector q is the sum of the vector p and the vector v. The vector v is determined based on the portion of the medical image I0 that is assigned to the patch PT.

FIG. 6 shows the vote map V1 of the first iteration step with the medical image I0 as an input image.

The vote map V1 comprises a plurality of pixels XV1. The vote map V1 is initialized to a predefined map so that the pixel values of all the pixels XV1 of the vote map V1 are equal.

According to one embodiment of the invention, all pixel of the predefined map have the same predefined pixel value and/or have pixel values selected from the same predefined range.

After that, for each patch of the plurality of patches the pixel value at the target location of that patch in the vote map is adjusted by incrementing the pixel value at the target location in the vote map by a predefined increment.

In FIG. 6, the value of the pixel, to which the vector q is pointing, is increased by a predefined increment, for example by one unit, because the patch PT as shown in FIG. 5 is contributing to it or, in other words, voting for it.

In FIG. 7, the arrows that are not marked with a cross, depict possible backward traces through the different iteration steps for some example patches.

During the shape simplification process, back-reference lists were generated. Starting from the blob-like structure SF in the vote map VF of the final iteration step and evaluating the back-reference lists in reverse order, the contributing patches of the medical image I0 can be traced back and aggregated to form the segmentation outcome OU of the object.

Patches that contributed only to pixel values of those pixels, that are not part of the structure SF of the vote map VF of the final iteration step, do not contribute to a backward trace as shown by the arrows marked with a cross.

According to one embodiment of the invention the boundaries of the segmentation outcome OU might be blurred. In particular, the number of patches or segmentation masks that contribute to the pixel value of a given pixel can decrease with increasing distance of the given pixel to the inner region of the segmentation of the object.

Figure 8:
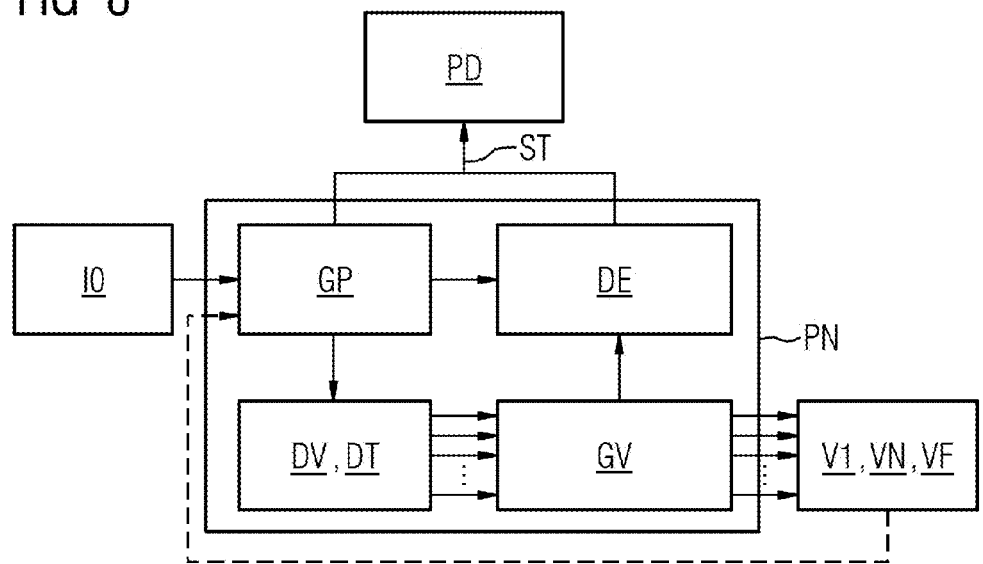
FIG. 8 shows a simplified workflow diagram illustrating a stage of the method according to one embodiment of the invention.

FIG. 8 shows a simplified workflow diagram illustrating a stage of the method according to one embodiment of the invention, wherein each iteration step of the plurality of iteration steps further comprises the following steps for each patch of the plurality of patches:

determining DE a patch encoding of the patch and/or a segmentation mask MS corresponding to the patch, storing ST data related to the patch in a database PD, the data related to the patch being selected from the group consisting of the patch, the patch location of the patch, the vote location of the patch, the target location of the patch, the portion of the image assigned to the patch, the segmentation mask corresponding to the patch, the patch encoding of the patch and combinations thereof.

Furthermore, for each iteration step of the plurality of iteration steps, the back-reference information of the iteration step and/or the vote map of the iteration step can be stored in the database.

The dotted line illustrates that a vote map, that is generated in a given iteration step, is used as an input image for the iteration step following the given iteration step.

Figure 9:
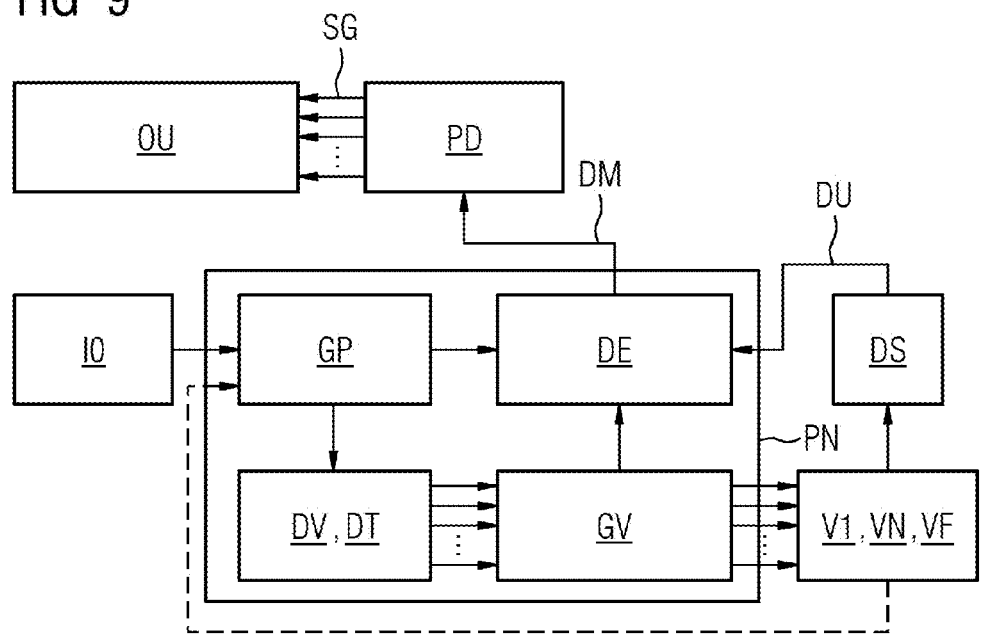
FIG. 9 shows a simplified workflow diagram illustrating a stage of the method according to one embodiment of the invention.

FIG. 9 shows a simplified workflow diagram illustrating a stage of the method according to one embodiment of the invention, the method further comprising:

providing a plurality of segmentation masks, the plurality of segmentation masks being stored in the database PD.

determining a subset of segmentation masks of the plurality of segmentation masks, wherein for each patch of the subset of patches a corresponding segmentation mask MS of the subset of segmentation masks is determined based on the patch encoding of the patch, the corresponding segmentation mask MS being similar to that patch, retrieving the subset of segmentation masks from the database PD, aggregating the segmentation masks of the subset of segmentation masks, wherein each segmentation mask of the subset of segmentation masks is allocated based on the patch location PL and/or the vote location VL of the patch corresponding to that segmentation mask, thereby obtaining the segmentation outcome OU.

The patch corresponding to a given segmentation mask is the patch, to which the segmentation mask corresponds.

Figure 10:
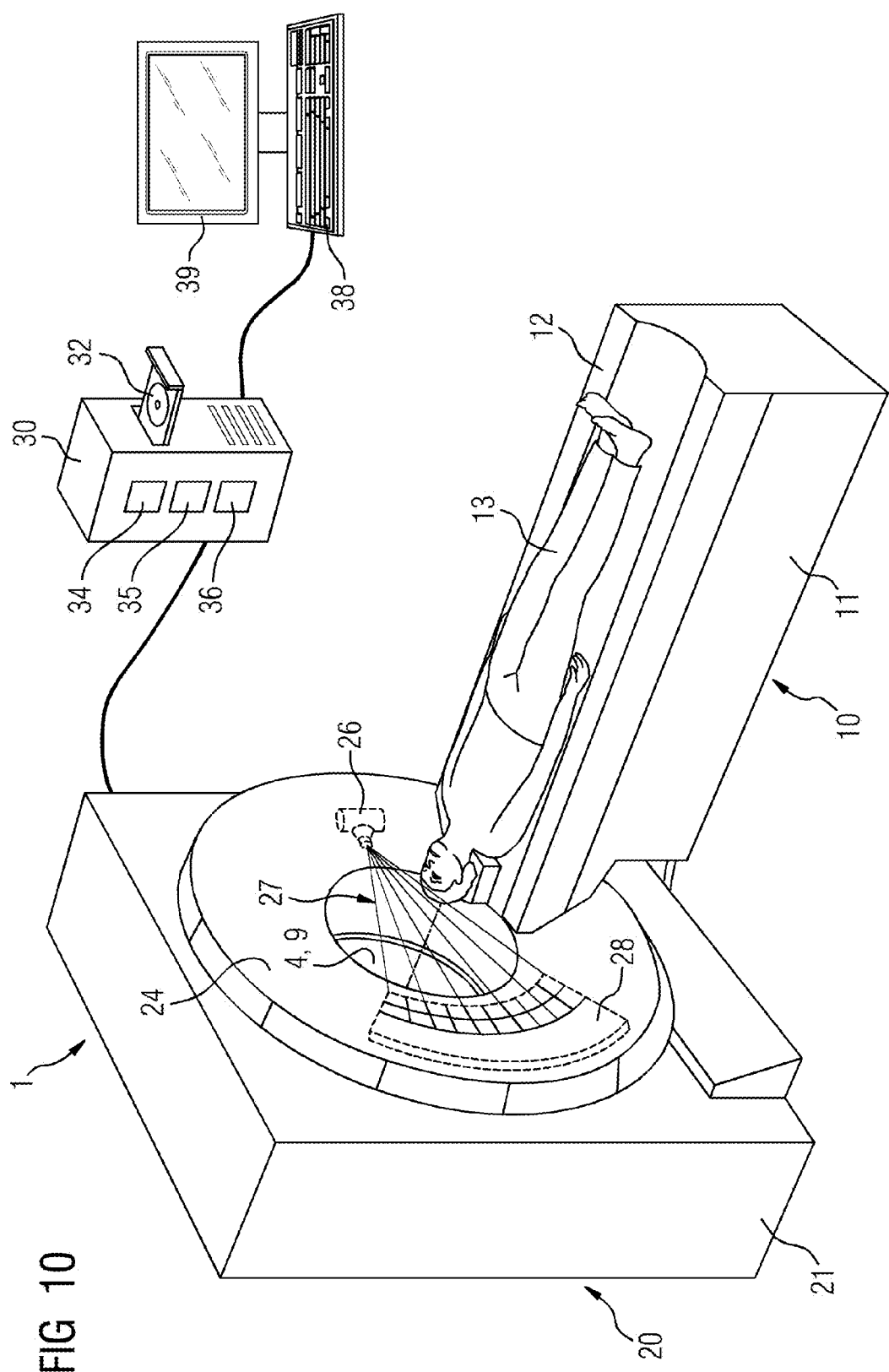
FIG. 10 shows a medical imaging device according to one embodiment of the invention.

FIG. 10 shows a medical imaging device 1 according to one embodiment of the invention, comprising the data processing unit 35.

A computed tomography device is shown, by way of example, for the medical imaging device 1, without limiting the general inventive idea.

The imaging device 1 has a gantry 20. The gantry 20 has a stationary support frame 21. The gantry 20 has a rotor 24 mounted so it can be rotated by a pivot bearing device. The imaging device 1 has an image recording region 4 formed by a tunnel-like opening 9. A region of an object to be imaged can be arranged in the image recording region 4.

The imaging device 1 has a patient-positioning device 10. The patient-positioning device 10 has a positioning table 11 and a transfer plate 12 for positioning the patient 13. The transfer plate 12 is arranged on the positioning table 11 so it can be moved relative to the positioning table 11 such that the transfer plate 12 can be introduced into the image recording region 4 in a longitudinal direction of the transfer plate 12.

A radiation projection device 26, 28 is arranged on the rotor 24. The radiation projection device 26, 28 has a radiation source 26 which is designed to emit radiation quanta, and a detector 28 which is designed for detection of radiation quanta. The radiation quanta 27 can pass from the radiation source 26 to the region to be imaged and, following an interaction with the region to be imaged, strike the detector 28. In this way a projection profile of the region to be imaged can be detected.

At least one projection profile respectively can be detected for different arrangements of the radiation source 26 and the detector in respect of the region of the object to be imaged by rotation of the radiation projection device 26, 28 about the image recording region. A plurality of projection profiles can form a projection data set. A medical image, in particular a tomographic medical image, of the region to be imaged can be reconstructed on the basis of a projection data set by the image reconstruction unit 36.

The imaging device 1 has a control device 30 for controlling the imaging device 1. The imaging device 1 also has an input unit 38 for inputting control information, for example, imaging parameters, and examination parameters and an output unit 39 for outputting control information and images, in particular a medical image with a segmentation outcome obtained by the method according to one embodiment of the invention.

The control device 30 can be, for example, a computer and/or a data processing system. The control device comprises the computer-readable medium 32, the processor 34, the data processing unit 35 and the image reconstruction unit 36.

Figure 11:
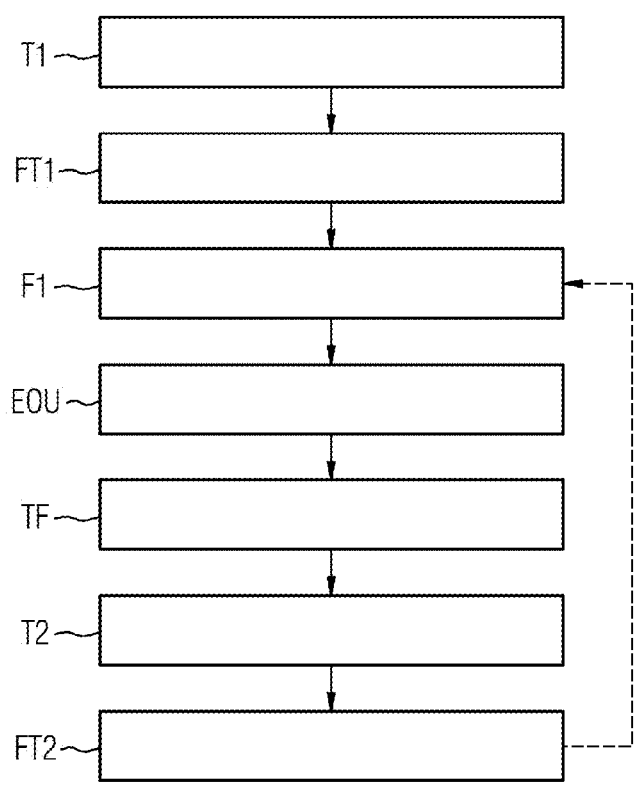
FIG. 11 shows a diagram illustrating a method according to one embodiment of the invention.

FIG. 11 shows a diagram illustrating a method according to one embodiment of the invention, the method comprising:

providing T1 a first set of training pairs, each training pair of the first set of training pairs comprising a training image and a corresponding training vote location, determining FT1 the function based on the first set of training pairs, executing F1 the steps of the method as illustrated in FIG. 1 using the function determined based on the first set of training pairs, editing EOU the segmentation outcome OU, determining TF a set of further training pairs based on the edited segmentation outcome OU, each further training pair of the set of further training pairs comprising a training image and a corresponding training vote location, determining T2 a second set of training pairs based on the set of further training pairs and/or at least a subset of the first set of training pairs, determining FT2 the function based on the second set of training pairs.

As indicated by the dotted arrow, the steps of the method as illustrated in FIG. 1 can be executed using the function determined based on the second set of training pairs.

Figure 12:
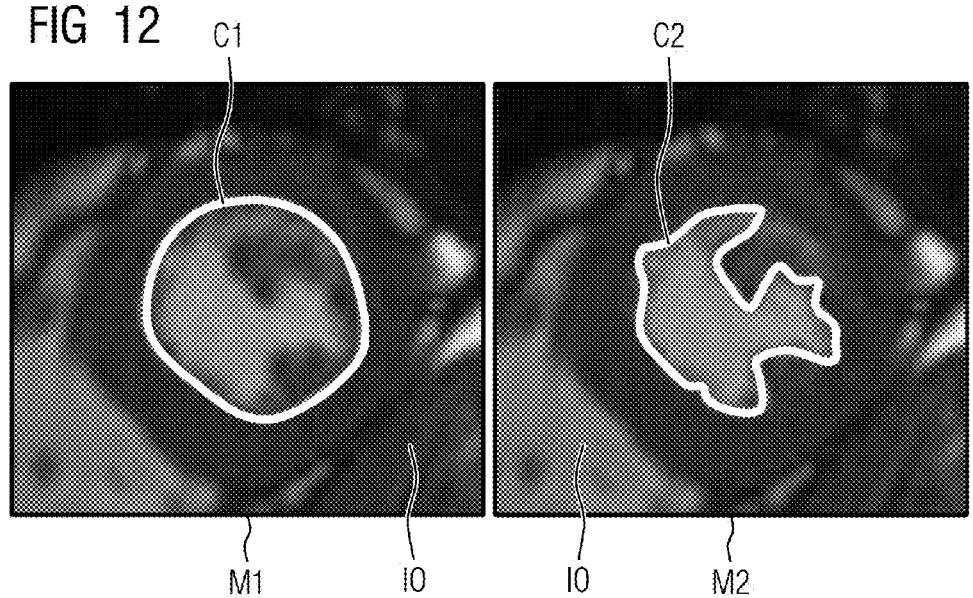
FIG. 12 shows two images, each with a segmentation of the left endocardial border of the heart.

FIG. 12 shows two images M1 and M2, each with a segmentation of the left endocardial border of the heart. The image M1 comprises the medical image I0 and the segmentation outcome C1. The image M2 comprises the medical image I0 and the segmentation outcome C2. The medical image I0 shows one short-axis slice of a magnetic resonance imaging acquisition of the left ventricle of a patient. The segmentation outcome C1 includes papillary muscles. The segmentation outcome C2 features essentially blood-pool only.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

BIBLIOGRAPHY

[1] T. Heimann and H.-P. Meinzer, "Statistical shape models for 3D medical image segmentation: a review", Medical Image Analysis, vol. 13, no. 4, pp. 543-563, 2009.
[2] L. Wang, K. Lekadir, S.-L. Lee, R. Merrifield and G.-Z. Yang, "A General Framework for Context-Specific Image Segmentation Using Reinforcement Learning,", IEEE Transactions on Medical Imaging, vol. 32, no. 5, pp. 943-956, 2013.
[3] F. Milletari, S.-A. Ahmadi, C. Kroll, A. Plate, V. Rozanski, J. Maiostre, J. Levin, 0. Dietrich, B. Ertl-Wagner, K. Bötzel and N. Navab, "Hough-CNN: Deep Learning for Segmentation of Deep Brain Regions in MRI and Ultrasound," arXiv:1601.07014v3, pp. 1-34, 2016.

What is claimed is:

1. A method for segmenting an object in a medical image, the method comprising:
providing the medical image;
performing a plurality of iteration steps, input of a first iteration step of the plurality of iteration steps including the medical image as an input image and the input of each further iteration step of the plurality of iteration steps includes a vote map generated in a preceding iteration step as the input image, wherein each iteration step of the plurality of iteration steps comprises:
generating a plurality of patches, a portion of the input image and a patch location being assigned to each patch of the plurality of patches, the patch location being indicative of a location of the portion of the input image relative to the input image,
for each patch of the plurality of patches
determining a vote location based on the portion of the respective input image assigned to the respective patch and
determining a target location based on the vote location and the patch location assigned to that patch;
generating a vote map, wherein each patch of the plurality of patches contributes to a respective pixel value at the target location of the respective patch in the vote map;
determining a structure in the vote map of the final iteration step of the plurality of iteration steps;
determining a subset of patches of the plurality of patches of the first iteration step that contributed to the structure in the vote map of the final iteration step; and
segmenting the object based on the subset of patches to obtain a segmentation outcome.

2. The method of claim 1, wherein at least one of
the patch location assigned to a respective patch is the location of the center pixel of the portion of the input image assigned to the respective patch relative to the respective input image, and
the vote location for a respective patch is a vector of the same dimension as the portion of the respective input image assigned to the respective patch.

3. The method of claim 2, wherein generating the vote map comprises:
initializing the vote map to a defined map; and
for each patch of the plurality of patches, adjusting a respective pixel value at the target location of the respective patch in the vote map.

4. The method of claim 3, wherein the pixel value at the target location in the vote map is adjusted by incrementing the pixel value at the target location in the vote map by a defined increment.

5. The method of claim 2, wherein each iteration step of the plurality of iteration steps further comprises:
generating a back-reference information, wherein for each pixel of the vote map, to which at least one patch of the plurality of patches contributed, the back-reference information designates the at least one respective patch of the plurality of patches that contributed to the respective pixel of the vote map.

6. The method of claim 5, wherein the subset of patches is determined based on the back-reference information of each iteration step of the plurality of iteration steps.

7. The method of claim 1, wherein generating the vote map comprises:
   initializing the vote map to a defined map; and
   for each patch of the plurality of patches, adjusting a respective pixel value at the target location of the respective patch in the vote map.

8. The method of claim 7, wherein the pixel value at the target location in the vote map is adjusted by incrementing the pixel value at the target location in the vote map by a defined increment.

9. The method of claim 1, wherein at least one of
   the structure in the vote map of the final iteration step is determined based on the pixel values of the pixels of the vote map of the final iteration step and
   the structure in the vote map of the final iteration step is determined by comparing the pixel values of the pixels of the vote map of the final iteration step with a threshold.

10. The method of claim 1, wherein the structure in the vote map of the final iteration step is determined based on a segmentation algorithm, and wherein the input of the segmentation algorithm comprises the vote map of the final iteration step.

11. The method of claim 1, wherein each iteration step of the plurality of iteration steps further comprises:
    generating a back-reference information, wherein for each pixel of the vote map, to which at least one patch of the plurality of patches contributed, the back-reference information designates the at least one respective patch of the plurality of patches that contributed to the respective pixel of the vote map.

12. The method of claim 11, wherein the subset of patches is determined based on the back-reference information of each iteration step of the plurality of iteration steps.

13. The method of claim 1, wherein segmenting of the object based on the subset of patches comprises:
    aggregating the patches of the subset of patches, wherein each patch of the subset of patches is allocated based on at least one of the patch location and the vote location of that patch, thereby obtaining the segmentation outcome.

14. The method of claim 1, wherein segmenting of the object based on the subset of patches comprises:
    providing a plurality of segmentation masks,
    determining a subset of segmentation masks of the plurality of segmentation masks, wherein for each respective patch of the subset of patches a corresponding segmentation mask of the subset of segmentation masks is determined, the respective corresponding segmentation mask being similar to the respective patch,
    aggregating the segmentation masks of the subset of segmentation masks, wherein each segmentation mask of the subset of segmentation masks is allocated based on at least one of the patch location and the vote location of the respective patch corresponding to the respective segmentation mask, thereby obtaining the segmentation outcome.

15. The method of claim 14, wherein for each patch of the subset of patches the respective corresponding segmentation mask of the subset of segmentation masks is determined based on a patch encoding of the respective patch.

16. The method of claim 1, wherein for each patch of the plurality of patches the vote location is determined based on a function, the input of the function comprising the respective portion of the input image assigned to the respective patch.

17. The method of claim 16, further comprising:
    providing a first set of training pairs, each training pair of the first set of training pairs including a training image and a corresponding training vote location, and
    determining the function based on the first set of training pairs.

18. The method of claim 17, wherein the determining comprises at least one of
    determining the function based on the first set of training pairs comprises training a machine learning system based on the first set of training pairs, thereby obtaining the function, and
    determining the function based on the second set of training pairs comprises training a machine learning system based on the second set of training pairs, thereby obtaining the function.

19. The method of claim 18, wherein at least one of the machine learning system and the function is based on an artificial neural network.

20. The method of claim 19, wherein the artificial neural network comprises a convolutional neural network.

21. The method of claim 16, further comprising:
    editing the segmentation outcome,
    determining a set of further training pairs based on the edited segmentation outcome, each further training pair of the set of further training pairs including a training image and a corresponding training vote location,
    determining a second set of training pairs based on at least one of the set of further training pairs and at least a subset of the first set of training pairs, and
    determining the function based on the second set of training pairs.

22. The method of claim 21, wherein determining the second set of training pairs comprises:
    representing the first set of training pairs by a sequence, wherein the training pairs of the first set of training pairs are subsequently ordered, and
    subsequently appending the further training pairs of the set of further training pairs to the sequence.

23. The method of claim 22, wherein determining the second set of training pairs further comprises:
    removing a subsequence of training pairs of the first set of training pairs from the sequence.

24. The method of claim 23, wherein the number of the training pairs of the subsequence, which is removed from the sequence, corresponds to the number of further training pairs of the set of further training pairs appended subsequently to the sequence.

25. The method of claim 21, wherein the determining comprises at least one of
    determining the function based on the first set of training pairs comprises training a machine learning system based on the first set of training pairs, thereby obtaining the function, and
    determining the function based on the second set of training pairs comprises training a machine learning system based on the second set of training pairs, thereby obtaining the function.

26. The method of claim 25, wherein at least one of the machine learning system and the function is based on an artificial neural network.

27. The method of claim 26, wherein the artificial neural network comprises a convolutional neural network.

28. The method of claim 22, wherein at least one of
    the sequence comprises a first part and a second part, one of the first part and the second part comprising the beginning of the sequence and the other one of the first part and the second part comprising the end of the sequence, the further training pairs of the set of further training pairs are appended subsequently at the first part of the sequence and the subsequence of training pairs of the first set of training pairs is removed from the second part of the sequence.

29. The method of claim 28, wherein the number of the training pairs of the subsequence, which is removed from the sequence, corresponds to the number of further training pairs of the set of further training pairs appended subsequently to the sequence.

30. The method of claim 23, wherein at least one of the sequence comprises a first part and a second part, one of the first part and the second part comprising the beginning of the sequence and the other one of the first part and the second part comprising the end of the sequence, the further training pairs of the set of further training pairs are appended subsequently at the first part of the sequence and the subsequence of training pairs of the first set of training pairs is removed from the second part of the sequence.

31. The method of claim 30, wherein the number of the training pairs of the subsequence, which is removed from the sequence, corresponds to the number of further training pairs of the set of further training pairs appended subsequently to the sequence.

32. A non-transitory computer program product including a computer program stored thereon, the computer program being loadable into a memory unit of a data processing system and including program code sections to make the data processing system execute the method of claim 1 when the computer program is executed in said data processing system.

33. A non-transitory computer-readable medium, on which program code sections of a computer program are stored, the program code sections being at least one of loadable into and executable in a data processing system to make the data processing system execute the method of claim 1 when the program code sections are executed in the data processing system.

34. A data processing unit for segmenting an object in a medical image, the data processing unit comprising:

a providing unit configured to provide the medical image;

an iteration unit configured to perform a plurality of iteration steps, wherein input of the first iteration step of the plurality of iteration steps includes the medical image as an input image, wherein input of each further iteration step of the plurality of iteration steps includes a vote map generated in a preceding iteration step as the input image, and wherein each iteration step of the plurality of iteration steps comprises:

generating a plurality of patches, a portion of the input image and a patch location being assigned to each patch of the plurality of patches, the respective patch location being indicative of the respective location of the portion of the input image relative to the input image, for each patch of the plurality of patches determining a vote location based on the respective portion of the input image assigned to the respective patch and determining a target location based on the respective vote location and the respective patch location assigned to the respective patch, generating a vote map, wherein each patch of the plurality of patches contributes to a pixel value at the respective target location of the respective patch in the vote map, a structure-determining unit configured to determine a structure in the vote map of the final iteration step of the plurality of iteration steps;

a subset-determining unit configured to determine a subset of patches of the plurality of patches of the first iteration step that contributed to the structure in the vote map of the final iteration step; and a segmenting unit configured to segment the object based on the subset of patches to obtain a segmentation outcome.

35. The data processing unit of claim 34, comprising a processor, configured as at least one of the iteration unit, structure-determining unit, the subset-determining unit and the segmenting unit.

36. A medical imaging device, comprising the data processing unit of claim 35.

37. A medical imaging device, comprising the data processing unit of claim 34.

* * * * *